(12) United States Patent
Cook et al.

(10) Patent No.: US 8,673,251 B2
(45) Date of Patent: *Mar. 18, 2014

(54) METHODS OF PREPARING CLUSTERBORON

(75) Inventors: Kevin S. Cook, Carl Junction, MO (US); Mark Oxford, Eastern Passage (CA)

(73) Assignee: SemEquip, Inc., N. Billerica, MA (US)

( * ) Notice: Subject to any disclaimer, the term of this patent is extended or adjusted under 35 U.S.C. 154(b) by 358 days.

This patent is subject to a terminal disclaimer.

(21) Appl. No.: 12/741,201

(22) PCT Filed: Nov. 3, 2008

(86) PCT No.: PCT/US2008/012470
§ 371 (c)(1),
(2), (4) Date: Mar. 28, 2011

(87) PCT Pub. No.: WO2009/058406
PCT Pub. Date: May 7, 2009

(65) Prior Publication Data
US 2011/0165053 A1    Jul. 7, 2011

Related U.S. Application Data

(60) Provisional application No. 61/001,685, filed on Nov. 2, 2007.

(51) Int. Cl.
C01B 6/10    (2006.01)

(52) U.S. Cl.
USPC .......................................... 423/294; 442/295

(58) Field of Classification Search
USPC .................................................. 423/294, 295
See application file for complete search history.

(56) References Cited

U.S. PATENT DOCUMENTS

2005/0163693 A1* 7/2005 Spielvogel et al. ........... 423/294
2005/0169828 A1* 8/2005 Spielvogel et al. ........... 423/294

OTHER PUBLICATIONS

Rom Haas, "Amberjetm Amberlite, Amberetp, Amberlyst Ion Exchange Resins and Catlysts" unknown date. p. 1.*

* cited by examiner

*Primary Examiner* — Wayne Langel
*Assistant Examiner* — Syed Iqbal
(74) *Attorney, Agent, or Firm* — Edwards Wildman Palmer LLP

(57) ABSTRACT

The invention provides new methods for synthesis of ClusterBoron® ($B_{18}H_{22}$). Preferred methods of the invention include generation of the conjugate acid of $B_{20}H_{18}{}^{2-}$ and degradation of the acid in solution to produce $B_{18}H_{22}$ in high yields and high purity. The invention further provides isotopically enriched boranes, particularly isotopically enriched $^{10}B_{18}H_{22}$ and $^{11}B_{18}H_{22}$.

22 Claims, 1 Drawing Sheet

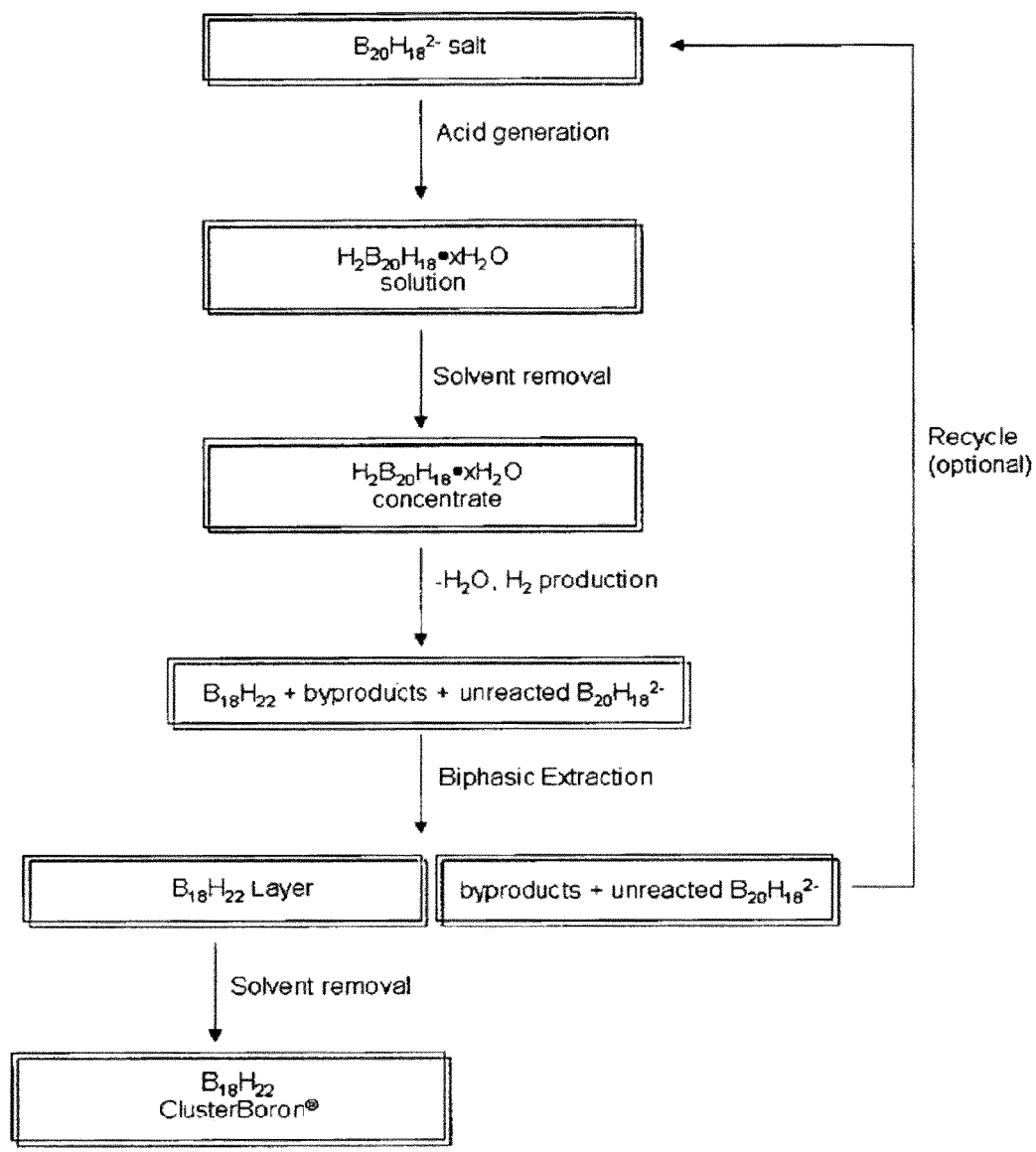

METHODS OF PREPARING CLUSTERBORON

RELATED APPLICATIONS

The present application is a 35 U.S.C. §371 U.S. national entry of International Application PCT/US2008/012470 (WO 2009/058406) having an International filing date of Nov. 3, 2008 which claims the benefit of U.S. provisional application No. 61/001,685 filed Nov. 2, 2007, both of which applications being incorporated herein by reference in their entireties.

BACKGROUND

1. Field of the Invention

The invention provides methods for synthesizing $B_{18}H_{22}$ as a mixture of syn and anti isomers, commonly marketed as ClusterBoron. The invention further provides isotopically enriched $B_{18}H_{22}$ prepared by the aforementioned methods. In particular, the invention relates the preparation of natural abundance $B_{18}H_{22}$, $^{10}B$-enriched $B_{18}H_{22}$ and $^{11}B$-enriched $B_{18}H_{22}$.

2. Background

Large boron hydride compounds have become important feed stocks for boron doped P-type impurity regions in semiconductor manufacture. More particularly, high molecular weight boron hydride compounds, e.g., boron hydride compounds comprising at least a five (5) boron atom cluster, are preferred boron atom feed stocks for molecular boron implantation.

An important aspect of modern semiconductor technology is the continuous development of smaller and faster devices. This process is called scaling. Scaling is driven by continuous advances in lithographic process methods, allowing the definition of smaller and smaller features in the semiconductor substrate which contains the integrated circuits. A generally accepted scaling theory has been developed to guide chip manufacturers in the appropriate resize of all aspects of the semiconductor device design at the same time, i.e., at each technology or scaling node. The greatest impact of scaling on ion implantation processes is the scaling of junction depths, which requires increasingly shallow junctions as the device dimensions are decreased. This requirement for increasingly shallow junctions as integrated circuit technology scales translates into the following requirement: ion implantation energies must be reduced with each scaling step. The extremely shallow junctions called for by modern, sub-0.13 micron devices are termed "Ultra-Shallow Junctions" or USJs.

Methods of manufacturing boron doped P-type junctions have been hampered by difficulty in controlling the ion-implantation process using boron. The single boron atom, being light (MW=10.8), can penetrate too deeply into a silicon substrate and diffuse throughout the substrate lattice rapidly during annealing or other elevated temperature processes.

Boron clusters or cages, e.g., boranes have been investigated as a feed stock for delivering molecular boron species to a semiconductor substrate with reduced penetration. See PCT/US03/20197.

Large boron hydride compounds, that is boron compounds having between 5 and about 100 boron atoms are preferred for use in molecular ion implantation methods for delivering boron atoms to a semiconductor substrate. Typically, there may be isomers of the boron hydride compound that exist. That is, boron hydrides with the same number of boron and hydrogen atoms that possess different chemical properties, e.g. structural isomers or stereoisomers. In addition, two or more structurally related boron hydride compounds having the same number of boron atoms but different numbers of hydrogen atoms have been isolated for various sized boron clusters. For example, pentaborane (9) and pentaborane (11) have chemical formulas of $B_5H_9$ and $B_5H_{11}$ respectively. Such compounds are frequently classified as closo ($B_nH_n$), nido($B_nH_{n+2}$), arachno ($B_nH_{n+4}$), hypho ($B_nH_{n+6}$), conjuncto ($B_nH_{n+8}$), and the like. Thus, different boron hydride species, including isomers and compounds containing various amounts of hydrogen, are frequently known for boron hydrides having n boron atoms. Jemmis, et al. have provided a review of various macropolyhedral boranes and known compounds having n boron atoms and various amounts of hydrogen.[1, 2]

Mixtures of isomers and mixtures of n-boron atom containing boron hydrides are suitable for use in the implantation methods discussed. The molecular ions generated by the ionization process of boron hydride mixtures will have uniform and narrow weight distributions.

Current synthetic technologies for the preparation of large boron hydride molecules, e.g., boron hydride molecules with more than 12 boron atoms, are often plagued by complicated synthetic processes, low isolated yields, and/or inconsistent reproducibility.

Although there are several synthetic routes reported in the literature for the preparation of $B_{18}H_{22}$ as a mixture of isomers, they are lengthy, often result in notably low yields, are unreliable and have safety issues associated with the synthesis.

It thus would be desirable to have new methods for preparation of $B_{18}H_{22}$.

SUMMARY

We have now discovered new methods for the preparation of octadecaborane, $B_{18}H_{22}$. The invention is particularly useful for facile synthesis and purification of large quantities of $B_{18}H_{22}$. The present invention also relates to isotopically-enriched $B_{18}H_{22}$. Whereas, by definition, enriched means the modification of the boron isotopes natural abundance. Depending on source natural abundance of the $^{10}B$ isotope ranges from 19.10% to 20.31% and natural abundance of the $^{11}B$ isotope ranges from 80.90% to 79.69%.

A typical molecular ion beam of $B_{18}H_{22}$ contains ions of a wide range of masses due to loss of a varying number of hydrogens from the molecular ion as well as the varying mass due to the two naturally occurring isotopes. As mass selection is possible in an implanter device used in semiconductor manufacture, use of isotopically enriched boron in $B_{18}H_{22}$ can greatly reduce the spread of masses, thereby providing an increased beam current of the desired implantation species. Thus, $^{11}B$ and $^{10}B$ isotopically-enriched $B_{18}H_{22}$ is also of great interest.

In one aspect, the invention includes methods of synthesizing octadecaborane ($B_{18}H_{22}$), the method comprising the steps of: (a) contacting the borane anion $B_{20}H_{18}{}^{2-}$ in solvent with an acid to produce a solution of $H_2B_{20}H_{18}.xH_2O$; (b) removing water and/or residual solvent from concentrating $H_2B_{20}H_{18}.xH_2O$ solution; and (c) isolating $B_{18}H_{22}$. Suitably, removing water and/or residual solvent from $H_2B_{20}H_{18}.xH_2O$ solution promotes $B_{18}H_{22}$ formation, In some aspects the invention provides methods of synthesizing $B_{18}H_{22}$ by methods comprising the steps of:
(a) contacting the borane anion $B_{20}H_{18}{}^{2-}$ in solvent with an acid to produce a solution of $H_2B_{20}H_{18}.xH_2O$;
(b) concentrating the mixture comprising $H_2B_{20}H_{18}.xH_2O$;

(c) removing water and residual solvent from the concentrated $H_2B_{20}H_{18}\cdot xH_2O$ solution to promote $B_{18}H_{22}$ formation;
(d) dissolution of the resulting residue in a biphasic mixture in which reaction byproducts and unreacted materials are dissolved into one solvent component and $B_{18}H_{22}$ is dissolved in the second solvent component;
(e) separation of the $B_{18}H_{22}$ containing and byproduct containing layers;
(f) isolation of high purity $B_{18}H_{22}$ through appropriate washes, drying and solvent removal;
(g) recycling the byproduct layers if necessary.
This is represented schematically in the flow chart (FIG. 2). Preferred methods of the invention are suitable to prepare isomerically pure $B_{18}H_{22}$ and mixtures of structural isomers of $B_{18}H_{22}$. That is, the method of the invention, provide $B_{18}H_{22}$ capable of generating a suitable molecular ion beam for ion implantation.

In some aspects of the invention, a solution of $B_{20}H_{18}^{2-}$ salt of the $B_{20}H_{18}^{2-}$ anion is contacted with an acid and the resulting solution is of $H_2B_{20}H_{18}\cdot xH_2O$ is concentrated by removal of the majority of solvent. Preferred solvents or solvent mixtures are solvents in which both the $B_{20}H_{18}^{2-}$ salt and $H_2B_{20}H_{18}\cdot xH_2O$ are soluble but not destroyed. These solvents and solvent mixtures may include water, alcohols, nitriles, ethers, cyclic ethers, sulfones, and the like.

In some aspects of the invention, the acid may be an inorganic acid capable of protonating the $B_{20}H_{18}^{2-}$ cluster with displacement of $B_{20}H_{18}^{2-}$ salt cation. Preferred acids have a $pKa<2.0$ and include, but are not limited to, hydrochloric acid, sulfuric acid, nitric acid, hydrobromic acid, hydroiodic acid, sulfurous acid, and selenic acid.

In some aspects of the invention, the acid may be an organic acid capable of protonating the $B_{20}H_{18}^{2-}$ cluster with displacement of $B_{20}H_{18}^{2-}$ salt cation. Preferred acids have a $pKa<2.0$ and include, but are not limited to, trifluormethaneacetic acid, trifluoroacetic acid, benzenesulfonic acid, oxalic acid, p-toluenesulfonic acid, trichloracetic acid, and dichloroacetic acid.

In some aspects of the invention, the acid may be any acidic ion-exchange resin capable of exchanging cations of a borane anion with protons are suitable for use in the methods of synthesizing $B_{18}H_{22}$ provided by the invention. Preferred acidic ion-exchange resins include cross-linked, solvent-insoluble resins having a plurality of acidic functional groups capable of exchanging a proton for the cation of the borane salt. Certain preferred acidic ion-exchange resins include aromatic or partially aromatic polymers comprising a plurality of sulfonic acid residues and more preferably include such aromatic or partially aromatic polymers which are cross-linked.

$B_{18}H_{22}$ is produced through removal of excess solvent and water from the concentrated $H_2B_{20}H_{18}\cdot xH_2O$ (where x is a real positive number) solution. Although not wishing to be bound by theory, conditions conducive to removal of water and other solvents of crystallization from the hydrated hydronium ion salt, $H_2B_{20}H_{18}\cdot xH_2O$ are suitable to induce degradation of at least a portion of the hydronium ion. Typically preferred degradation conditions include the use of vacuum ovens, dry inert gas streams, or contacting the hydrated hydronium salt one or more drying agents such as molecular sieves, phosphorus pentoxide, alumina, silica, silicates and the like, or a combination thereof. Temperatures that promote the removal of water from the system range from at least about 0° C. to about 250° C.

In some aspects of the invention, dissolution of the reaction residue is achieved with a multi-solvent mixture. Solvent mixtures selectively extract $B_{18}H_{22}$ into one layer to allow for facile isolation of product. Byproducts and remaining $B_{20}H_{18}^{2-}$ species are extracted into a second layer and not decomposed so that recycle of the $B_{20}H_{18}^{2-}$ material is possible. Preferred solvent mixtures include, but are not limited to, acetonitrile/hexanes, acetonitrile/cyclohexane, water/hexanes, water/cyclohexane, acetonitrile/benzene, water/benzene, and water/toluene.

In a preferred aspect, the invention provides methods of synthesizing $B_{18}H_{22}$ by methods comprising the steps of:
(a) contacting the borane anion $B_{20}H_{18}^{2-}$ in an acetonitrile:water solvent mixture with an acid ion-exchange resin to produce a solution of $H_2B_{20}H_{18}\cdot xH_2O$;
(b) concentrating the mixture comprising $H_2B_{20}H_{18}\cdot xH_2O$;
(c) removing water and solvent from the reaction mixture through the use of a 30-55° C. vacuum;
(d) extraction of reaction residues with an acetonitrile:hexanes biphasic solvent mixture;
(e) separation of the hexanes layer from the acetonitrile layer;
(f) washing the hexane layer with acetonitrile followed by water and isolation of $B_{18}H_{22}$ through removal or concentration of the hexanes solution;
(g) treating the acetonitrile layer according to steps (a)-(f)
Preferred methods of the invention are suitable to provide $B_{18}H_{22}$ capable of generating a suitable molecular ion beam for ion implantation and other industrial uses. For the majority of current and perceived uses, including ion implantation, the $B_{18}H_{22}$ produced by the above method is free of major metals contamination and does not require any further purification, for example, by sublimation or re-crystallization.

The methods of synthesis, which provide $B_{18}H_{22}$ in high isolated yield (>50%) and with few synthetic procedures, are suitable for use in preparing isotopically enriched $B_{18}H_{22}$, e.g., the isotopic concentration of $^{10}B$ is 50% or more or the isotopic concentration of $^{11}B$ is 90% or more. Preparation of isotopically pure or isotopically enriched $^{10}B$ or $^{11}B_{18}H_{22}$ is practical using the methods of synthesis of the invention due, in part, to the limited number of synthetic steps, mass efficiency, and high overall synthetic yield (>60% from $B_{20}H_{18}^{2-}$).

Other aspects of the invention are disclosed infra.

BRIEF DESCRIPTION OF THE DRAWINGS

FIG. 1 shows schematically a preferred process of the invention;

DETAILED DESCRIPTION

FIG. 1 shows a specifically preferred process of the invention.

In methods of the invention wherein the isotopic concentration of $^{10}B$ atoms suitably may be greater than the natural abundance, e.g. wherein at least about 50% of the boron atoms present in the product $B_{18}H_{22}$ are $^{10}B$, or wherein at least about 80% of the boron atoms present in the product $B_{18}H_{22}$ are $^{10}B$, or wherein at least about 90% of the boron atoms present in the product $B_{18}H_{22}$ are $^{10}B$, or wherein at least about 95% of the boron atoms present in the product $B_{18}H_{22}$ are $^{10}B$, or wherein at least about 99% of the boron atoms present in the product $B_{18}H_{22}$ are $^{10}B$.

In the methods of the invention, the isotopic concentration of $^{11}B$ atoms suitably may be greater than the natural abundance, e.g. wherein at least about 90% of the boron atoms present in the product $B_{18}H_{22}$ are $^{11}B$, or wherein at least about 95% of the boron atoms present in the product $B_{18}H_{22}$ are $^{11}B$, or wherein at least about 99% of the boron atoms present in the product $B_{18}H_{22}$ are $^{11}B$.

The invention now being generally described, it will be more readily understood by reference to the following example, which is included merely for purposes of illustration of certain aspects and embodiments of the present invention, and are not intended to limit the invention.

EXAMPLE

Re-crystallized but not dried $(HNEt_3)_2B_{20}H_{18}\cdot xH_2O$ prepared from $(HNEt_3)_2B_{10}H_{10}$ (400.0 g, 1.24 mol) is dissolved into 3 L of acetonitrile and 500 mL of water. The solution is then contacted with a 10 kg column of Amberlite IR-120 acid ion exchange resin. The $H_2B_{20}H_{18}\cdot xH_2O$ solution is eluted with a further 3 L of acetonitrile and eluent and washings combined. The mixture is concentrated to give a viscous yellow oil and the mixture transferred to a glass tray. The glass tray is placed into a 40° C. vacuum oven and placed under dynamic vacuum. Following removal of excess solvent and water, off gassing is observed and a hard residue slowly forms. The residue is extracted with a biphasic acetonitrile/hexane mixture (750 ml/2 L). The yellow acetonitrile layer is separated from the hexanes layer and set aside. If necessary, insolubles are filtered from the mixture prior to promote facile separation. The hexane layer is washed with acetonitrile (2×200 mL), water (3×200 mL) and dried over $MgSO_4$. The hexane is removed under vacuum to give white $B_{18}H_{22}$ (76.5 g, 56.9% from $B_{10}H_{10}^{2-}$). Though not necessary to achieve good yields, the acetonitrile layer and acetonitrile washings are combined and exposed to acid exchange columns. $B_{18}H_{22}$ is formed and isolated in the same manner as above (12.8 g additional material, 89.3 g total yield, 66.4%).

The invention has been described in detail with reference to preferred embodiments thereof. However, it will be appreciated that those skilled in the art, upon consideration of the disclosure, may make modifications and improvements within the spirit and scope of the invention.

REFERENCES

1 Jemmis, E. D.; Balakrishnarajan, M. M.; Pancharatna, P. D., Electronic Requirements for Macropolyhedral Boranes. *Chem. Rev.* 2002, 102, 93-144.
2. Jemmis, E. D.; Balakrishnarajan, M. M.; Pancharatna, P. D., A unifying Electron-Counting Rule for Macropolyhedral Boranes, metallaboranes, and Metallocenes. *J. Amer. Chem. Soc.* 2001, 123, 4313-4323.
3. Pitochelli, A. R.; Hawthorne, M. F., The Preparation of a New Boron Hydride $B_{18}H_{22}$. *J. Amer. Chem. Soc.* 1962, 84, 3218.
4. Hawthorne, M. F.; Pilling, R. L.; Stokely, P. F., The preparation and rearrangement of the three isomeric B20H18 4– ions. *J. Am. Chem. Soc.* 1965, 87, 1893-1899.
5. Olsen, F. P.; Vasavada, R. C.; Hawthorne, M. F., The chemistry of n-B18H22 and i-B18H22. *J. Am. Chem. Soc.* 1968, 90, (15), 3946-3951.
6. Chamberland, E. L.; Muetterties, E. L., Chemistry of Boranes. XVIII. Oxidation of B10H10-2 and its derivatives. *Inorg. Chem.* 1964, 3, 1450-1456.

All of the patents and publications cited herein are hereby incorporated by reference.

Those skilled in the art will recognize, or be able to ascertain using no more than routine experimentation, many equivalents to the specific embodiments of the invention described herein. Such equivalents are intended to be encompassed by the following claims.

What is claimed is:

1. A method of synthesizing octadecaborane ($B_{18}H_{22}$), the method comprising the steps of:
   (a) contacting the borane anion $B_{20}H_{18}^{2-}$ in solvent with an acid to produce a solution of $H_2B_{20}H_{18}\cdot xH_2O$;
   (b) removing water and/or residual solvent by concentrating $H_2B_{20}H_{18}\cdot xH_2O$ solution;
   (c) isolating $B_{18}H_{22}$.

2. The method of claim 1 wherein removing water and/or residual solvent from $H_2B_{20}H_{18}\cdot xH_2O$ solution promotes $B_{18}H_{22}$ formation.

3. The method of claim 1, wherein the $B_{20}H_{18}^{2-}$ annion is present in an alkyl ammonium salt with a cation formula of $[NR^1 R^2R^3R^4]^+$, wherein
   $R^1$, $R^2$, and $R^3$ are independently selected from the group consisting of hydrogen, $C_{1-20}$alkyl, $C_{6-10}$aryl, $C_{7-10}$aralkyl, or any two of $R^1$, $R^2$, or $R^3$ taken in combination form a heterocyclic ring; and
   $R^4$ is hydrogen, $C_{1-20}$alkyl, or $C_{6-10}$aryl.

4. The method of claim 1 wherein the acid is an organic acid having a pKa of less than about 2.

5. The method of claim 1 wherein the acid is an inorganic acid having a pKa of less than about 2.

6. The method of claim 1 wherein the acid is an acidic ion-exchange resin.

7. The method of claim 1 wherein the solvent is a mixture of aqueous and non-aqueous solvents.

8. The method of claim 7 wherein the non-aqueous solvent is selected from the group consisting of alcohols, nitriles, ethers, and combinations thereof.

9. The method of claim 7 wherein the non-aqueous solvent comprises methanol, ethanol, acetonitrile, tetrahydrofuran, dioxane, or a combination thereof.

10. The method of claim 7 wherein the non-aqueous solvent comprises between about 1% and about 99% acetonitrile by volume.

11. The method of claim 7 wherein the non-aqueous solvent comprises between about 80% and about 95% acetonitrile by volume.

12. The method of claim 7 wherein the non-aqueous solvent is acetonitrile.

13. The method of claim 1 wherein at least about 50% of the boron atoms present in the product $B_{18}H_{22}$ are $^{10}B$.

14. The method of claim 1 wherein at least about 90% of the boron atoms present in the product $B_{18}H_{22}$ are $^{11}B$.

15. A method of synthesizing octadecaborane ($B_{18}H_{22}$), the method comprising the steps of:
   (a) contacting the borane anion $B_{20}H_{18}^{2-}$ in solvent with an acid to produce a solution of $H_2B_{20}H_{18}\cdot xH_2O$;
   (b) optionally concentrating the solution of $H_2B_{20}H_{18}\cdot xH_2O$;
   (c) removing water and residual solvent from the $H_2B_{20}H_{18}\cdot xH_2O$ solution;
   (d) optionally dissolution of the resulting residue;
   (e) separating the $B_{18}H_{22}$ containing and byproduct containing layers;
   (f) isolating $B_{18}H_{22}$ in a high purity;
   (g) optionally recycling the byproduct layers;
   wherein the $B_{18}H_{22}$ is isotopically enriched and contains boron atoms of $^{10}B$ and/or $^{11}B$, wherein said $^{10}B$ and/or $^{11}B$ atoms are present at a concentration greater than their natural abundance.

16. The method of claim 15, wherein, in optional step (d), the residue is treated with a biphasic mixture, in which reaction byproducts and unreacted materials are dissolved into one solvent component, and $B_{18}H_{22}$ is dissolved in the second solvent component.

17. The method of claim 15, wherein in step (f) $B_{18}H_{22}$ is isolated through washing, drying and/or solvent removal.

18. The method of claim 15 wherein recycling the byproduct layers is conducted zero times.

19. The method of claim 15 wherein steps (a) through (f) are repeated one time.

20. The method of claim 15 wherein steps (a)-(f) are repeated more than one time.

21. A method of synthesizing octadecaborane ($B_{18}H_{22}$), the method comprising the steps of:
   (a) contacting the borane anion $B_{18}H_{22}^{2-}$ in an acetonitrile:water solvent mixture with an acid ion-exchange resin to produce a solution of $H_2B_{20}H_{18} \cdot xH_2O$;
   (b) concentrating the mixture comprising $H_2B_{20}H_{18} \cdot xH_2O$;
   (c) removing water and solvent from the reaction mixture through the use of a 30-55° C. vacuum oven;
   (d) extraction of reaction residues with an acetonitrile:hexanes biphasic solvent mixture;
   (e) separation of the hexanes layer from the acetonitrile layer;
   (f) washing the hexanes layer with acetonitrile followed by water;
   (g) isolation of $B_{18}H_{22}$ through removal or concentration of the hexanes solution;
   (h) treating the acetonitrile layer and washings according to step (a)-(g);
   wherein the $B_{18}H_{22}$ is isotopically enriched and contains boron atoms of $^{10}B$ and/or $^{11}B$, wherein said $^{10}B$ and/or $^{11}B$ atoms are present at a concentration greater than their natural abundance.

22. A method of synthesizing octadecaborane ($B_{18}H_{22}$), the method comprising the steps of:
   (a) contacting the borane anion $B_{18}H_{22}^{2-}$ in an 6:1 acetonitrile:water solvent mixture with an Amberlite acid ion-exchange resin to produce a solution of $H_2B_{20}H_{18} \cdot xH_2O$;
   (b) concentrating the mixture comprising $H_2B_{20}H_{18} \cdot xH_2O$;
   (c) removing water and solvent from the reaction mixture through the use of a 40° C. vacuum oven;
   (d) extraction of reaction residues with an acetonitrile:hexanes biphasic solvent mixture;
   (e) separation of the hexanes layer from the acetonitrile layer;
   (f) washing the hexanes layer with acetonitrile followed by water;
   (g) isolation of $B_{18}H_{22}$ through removal or concentration of the hexanes solution;
   wherein the $B_{18}H_{22}$ is isotopically enriched and contains boron atoms of $^{10}B$ and/or $^{11}B$, wherein said $^{10}B$ and/or $^{11}B$ atoms are present at a concentration greater than their natural abundance.

* * * * *

UNITED STATES PATENT AND TRADEMARK OFFICE
CERTIFICATE OF CORRECTION

Page 1 of 1

PATENT NO. : 8,673,251 B2
APPLICATION NO. : 12/741201
DATED : March 18, 2014
INVENTOR(S) : Kevin Cook It is certified that error appears in the above-identified patent and that said Letters Patent is hereby corrected as shown below:

On the Title Page
Item (56), in Column 2, under (Other Publications)
Line 2, delete "Catlysts"" and insert -- Catalysts" --, therefor.

In the Specification
Column 3
Lines 36-37, delete "trifluormethaneacetic" and insert -- trifluoromethaneacetic --, therefor.
Line 38, delete "trichloracetic" and insert -- trichloroacetic --, therefor.

In the Claims
Column 6
Line 2, in Claim 1, delete "octadecaborance" and insert -- octadecaborane --, therefor.
Line 8, in Claim 1, delete "$B_{18}H_{22}$." and insert -- $B_{18}H_{22}$; --, therefor.
Line 9, in Claim 1, below "$B_{18}H_{22}$." insert -- wherein the $B_{18}H_{22}$ is isotopically
    enriched and contains boron atoms of $^{10}B$ and/or $^{11}B$, wherein said $^{10}B$ and/or $^{11}B$ atoms are
    present at a concentration greater than their natural abundance. --.
Line 58, in Claim 15, after "byproduct" insert -- containing --.

Signed and Sealed this
Second Day of September, 2014

Michelle K. Lee
*Deputy Director of the United States Patent and Trademark Office*